United States Patent
Lahens

(10) Patent No.: US 6,234,118 B1
(45) Date of Patent: *May 22, 2001

(54) DISPOSABLE DEODORANT ATTACHMENT PATCH HAVING SLOTS AT EACH END

(76) Inventor: Albert Lahens, 200 - 37th St., Union City, NJ (US) 07087

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/153,410

(22) Filed: Sep. 15, 1998

(51) Int. Cl.⁷ .............................. A62B 35/00; A01K 29/00
(52) U.S. Cl. .............................. 119/860; 119/654
(58) Field of Search ....................... 119/652, 654, 119/792, 866; 239/56; 424/402

(56) References Cited

U.S. PATENT DOCUMENTS

| | | | |
|---|---|---|---|
| 2,808,030 | * 10/1957 | Costanzo | 119/860 |
| 3,477,409 | * 11/1969 | Costanzo | 119/860 |
| 3,814,061 | * 6/1974 | Aries et al. | 119/654 |
| 4,068,624 | 1/1978 | Ramney | 119/654 |
| 4,145,001 | 3/1979 | Weyenberg et al. | 239/56 |
| 4,208,986 | 6/1980 | Costanzo | 119/860 |
| 4,304,675 | 12/1981 | Corey et al. | 8/142 |
| 4,739,928 | 4/1988 | O'Neil | 239/45 |
| 4,805,839 | 2/1989 | Malek | 239/337 |
| 4,849,606 | 7/1989 | Martens, III et al. | 392/390 |
| 4,900,876 | 2/1990 | Bushman et al. | 119/654 |
| 4,901,674 | 2/1990 | Boshman et al | 119/651 |
| 5,144,913 | 9/1992 | Yasui | 119/860 |
| 5,395,047 | * 3/1995 | Pendergrass, Jr. | 239/56 |
| 5,403,588 | 4/1995 | Santa Ana, Jr. et al. | 424/402 |
| 5,529,243 | * 6/1996 | Hoyt et al. | 239/56 |
| 5,555,848 | 9/1996 | Trujillo et al. | 119/654 |

* cited by examiner

Primary Examiner—Charles T. Jordan
Assistant Examiner—Elizabeth Shaw

(57) ABSTRACT

A flat piece of material consisting of a body of material 10 and having apertures 12 placed at each end of said body 10. The said body 10 having been impregnated with a volatile substance.

3 Claims, 5 Drawing Sheets

DISPOSABLE DEODORANT ATTACHMENT PATCH HAVING SLOTS AT EACH END

BACKGROUND

1. Field of Invention

This invention relates to attachment deodorants, specifically to such attachments which are disposable and provide a fragrant scent.

2. Description of Prior Art

U.S. Pat. No. 4,739,928 is an air freshener that uses a liquid deodorant to provide a pleasant scent to the nearby environment. The problem with this type of deodorant is that it is meant to be used in a stationary environment. In other words, because it uses a liquid deodorant in a relatively large plastic container it cannot be employed in any dynamic environment such as, cars, gym bags, or on a pet without causing damage to them.

There exists an abundant variety of air fresheners for cars, homes, offices. But none of these air fresheners address the issue of pet odors. U.S. Pat. No. 4,849,606 offers a room air freshener that operates by being plugged into an electrical outlet. While this may freshen up the room, it is not a practical or energy efficient method to masking odors.

U.S. Pat. No. 4,304,675 offers a different approach to deodorizing rooms. A fragrant powder is sprinkled over the floor surface, or rug. After the room has been treated with the powder, it is then vacuumed to pick up the powder. While this may freshen a room temporarily, it is not a practical method for providing a deodorant effect, obviously it would become a tedious task if one would have to vacuum every time a deodorant effect was desired.

Another deodorizing approach is propellant based deodorants. U.S. Pat. No. 4,805,839 deals with such deodorants. While it may provide a quick and easy deodorizing effect it does not last long. Furthermore, this method of deodorant is not a practical one for cars, pets, carry on items such as gym bags.

U.S. Pat. No. 4,145,001 depicts a different type of packaging for deodorants. It is composed of a multi-layer strip. One side has a non-permeable laminate used to prevent volatile substances, such as perfumes from escaping. When the strip is used the laminate is peeled off, thus exposing the fragrant membrane. This type of packaging is only suitable for dispensing small amounts of deodorizer. As a result, this type of packaging for deodorants is obsolete when it comes to pet odors. One immediate problem with this is that the small quantities of deodorizer released from this type of package would succumb to the pet odors. Thus the purpose of providing an effective deodorant against pet odors would be defeated.

Since the deodorant packaging was designed to be flat it would be out of it's element to attach this package around an animal's neck. Furthermore, this type of deodorant packaging was never designed to be used on an animal's neck.

Bushman (U.S. Pat. No. 4,900,876) deals with a collar which releases powder through a plurality of pores. Unlike the small, compact design of the collar attachment which attaches to an exisitng collar, this bulky collar is not an effective design for providing an effective means to provide deodorant for a pet.

Bushman (U.S. Pat. No. 4,901,674) relates to a bulky cartridge packed collar for releasing powder. In contrast to the collar attachment patch which does wrap around the animal's neck. Furthermore, Bushman primarily deals with the delivery of a powder substance into the environment. Bushman has no common ground with the present invention at hand which is a collar attachment which attaches to an exisiting collar. Also the use of cartridges clearly distinguishes Bushman from present invention at hand.

Yasui (U.S. Pat. No. 5,144,913) deals primarily with a collar which is composed of an acrylic fiber and or nylon fiber impregnated with copper sulfide. The use of copper sulfide does not completely eliminate the body odors of pets. Copper sulfide being a chemical substance does not present an agreeable scent to eliminate, or mask pet odors.

Costanzo (U.S. Pat. No. 4,208,986) employs the use of a rigid housing with a membrane housed inside. Apart from being bulky, and concave in shape Costanzo considerably differs from the present invention at hand. While Costanzo uses rivets for attachment to a collar, present invention uses slots which provide for easy installation. Also the bulky package does not promote the most easy and pet friendly design for providing a pet deodorant.

Trujillo (U.S. Pat. No. 5,555,848) is the combination of flea collar with a conventional retraining collar. This invention has no relevant ground with the present invention at band which is a deodorant attachment patch which attaches to an existing collar/belt.

Ramney (U.S. Pat. No. 4,068,624) employs the use of tablets for releasing a substance into the ambient air. Ramney teaches con y to present invention at hand. Whereas, present invention at band is a disposable, deodorant, attachment patch Ramney uses a permanent collar that is refilled with tablets to provide the desired effect.

Santa Ana, Jr. (U.S. Pat. No. 5,403,588) is a disposable body deodorant pad which employs volatile substances such as isoproply alcohol, acetone and aluminum chloride. By rubbing this on the skin, bacteria and oils are eliminated thus providing a deodorizing effect. This completely teaches against the present invention at band. Present invention at hand does not physically touch the skin of the animal. The attachment patch attaches to an existing pet collar, thus the attachment patch does not come into direct contact with the animal's skin.

Weyenberg (U.S. Pat. No. 4,145,001) uses a plurality of layered films. To release the volatile substance the top layer is peeled off. This deodorizing packaging teaches against present invention at hand. The design is not meant to be attached to a pet's collar, or as a deodorant patch to be used in car, gym bag etc.

In retrospect none of these cited collars/deodorants offer a practical solution to the problem of pet, and ambient odors.

OBJECTS AND ADVANTAGES

Accordingly, several objects and advantages of my invention are:

to provide a deodorant designed to mask odors.

to provide a convenient and practical method in dealing with odor.

to provide a cheap method that will give a pleasant scent.

DRAWING FIGURES

REFERENCE NUMERALS

10 attachment patch
12 slots
14 conventional collar/belt
16 rear view mirror
18 key holder

DESCRIPTION—FIGS. 1 to 5

Figure 1:
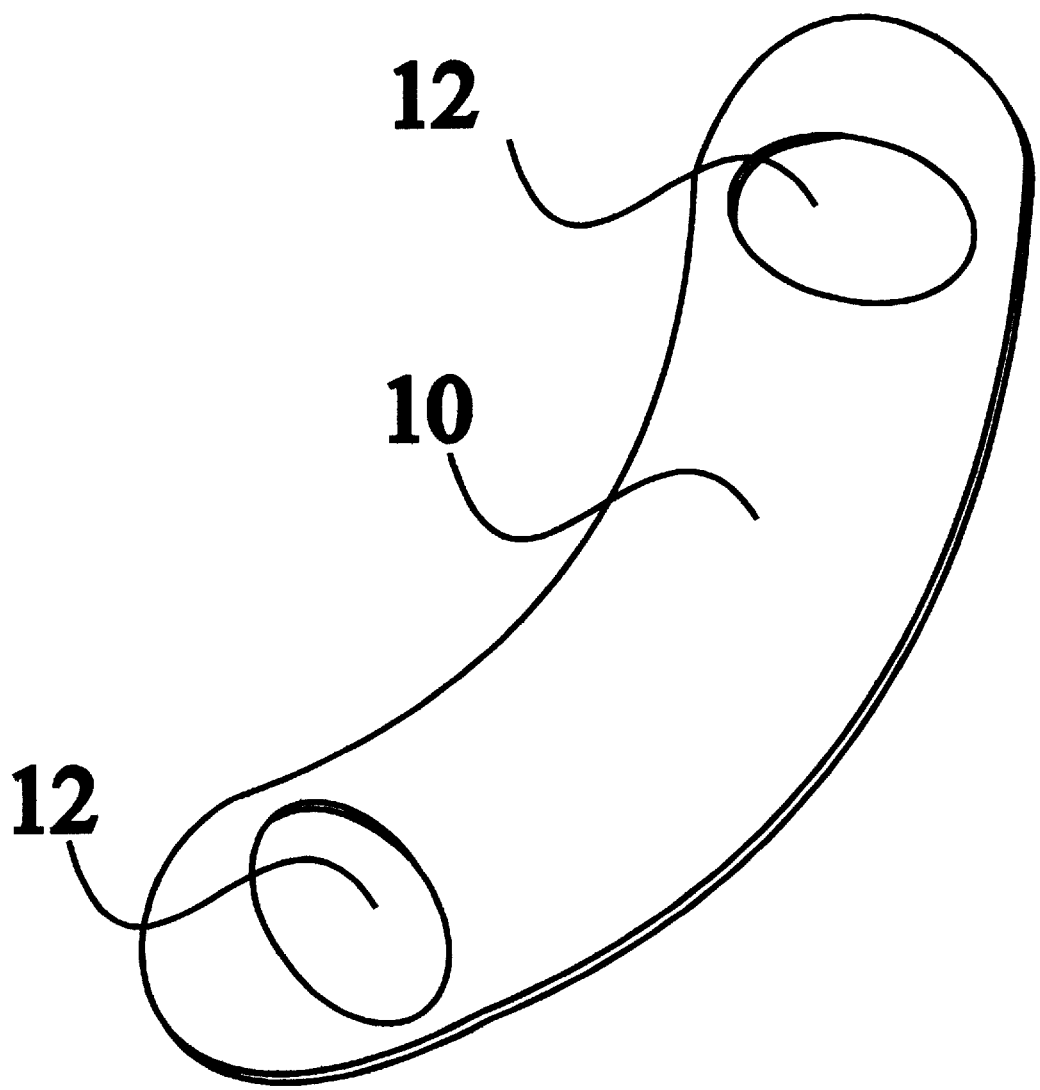
FIG. 1 shows an enlarged perspective view of the attachment patch with slots located at each end.

A typical embodiment of the present invention is illustrated in FIG. 1. FIG. 1 shows a perspective view of the attachment patch. The patch 10 has a plurality of slots 12 located at each end.

Figure 2:
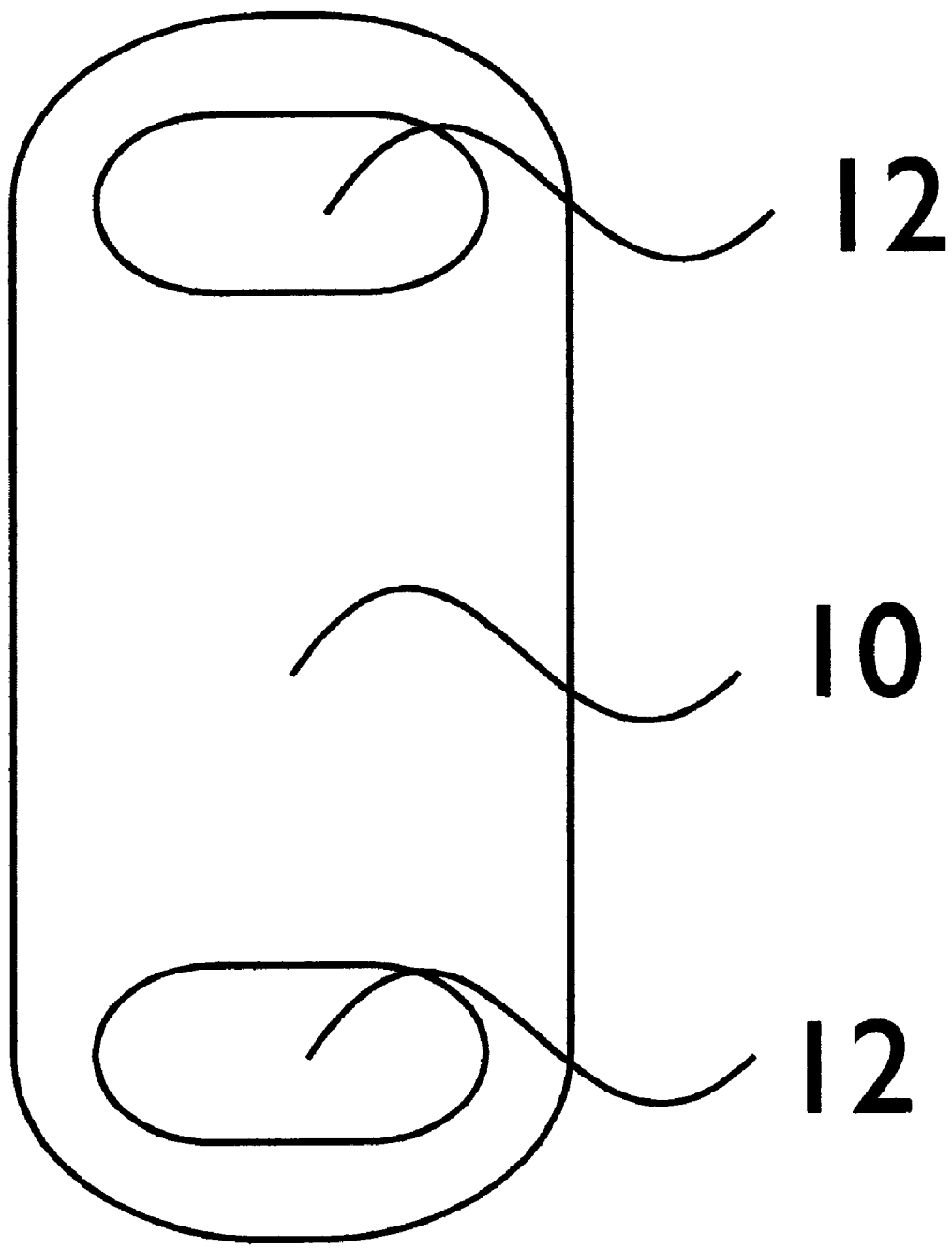
FIG. 2 shows an enlarged frontal view of attachment patch.

FIG. 2 displays an enlarged frontal view of the disposable attachment patch 10. A plurality of slots 12 are shown at each end of the attachment patch.

Figure 3:
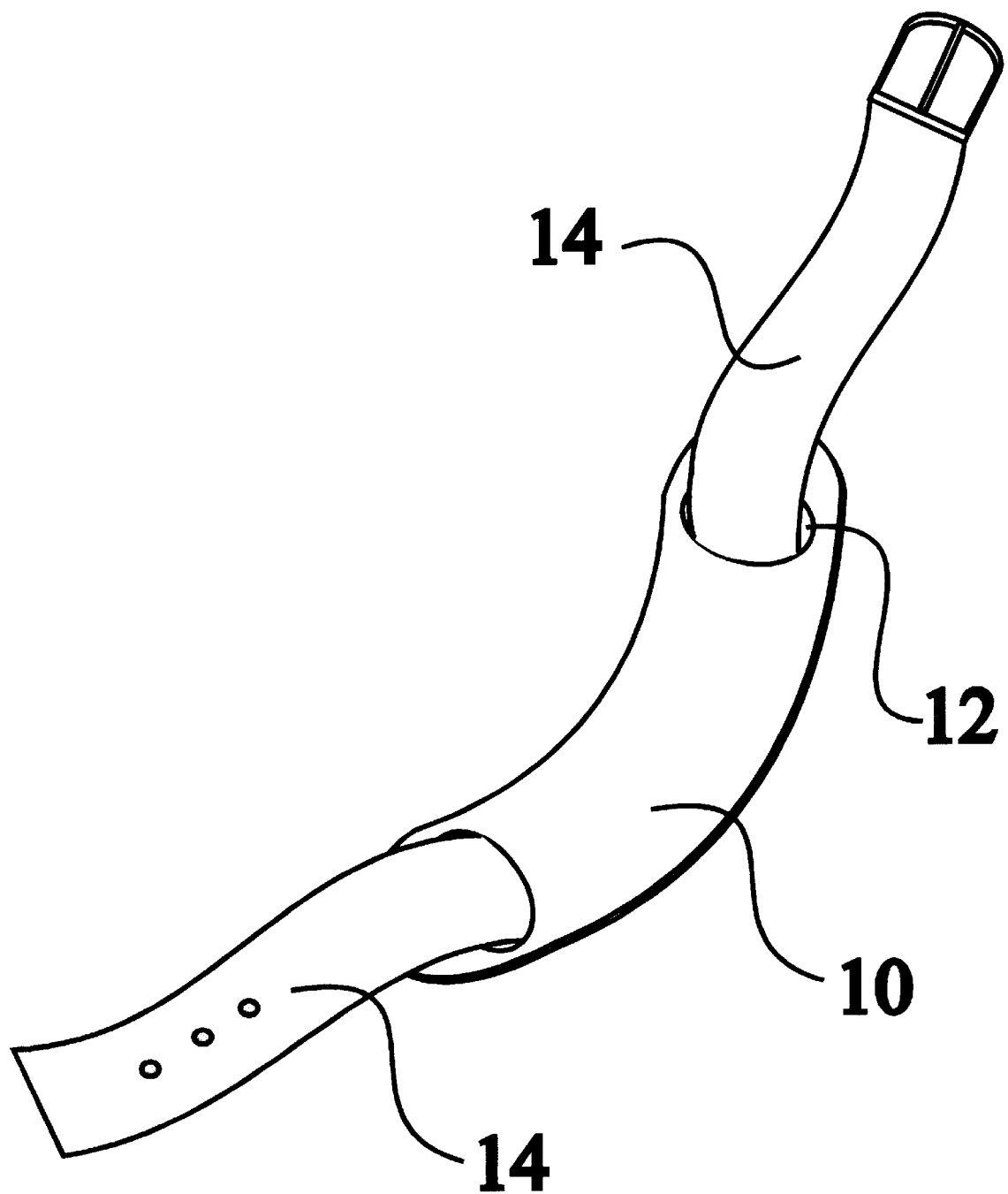
FIG. 3 shows a perspective view of the deodorant attachment patch on a conventional collar/belt.

FIG. 3 shows a perspective view of the disposable attachnent patch 10 attached to a conventional collar/belt 14. The attachment patch 10 slides onto the collar/belt 14 by employing the slots 12.

Figure 4:
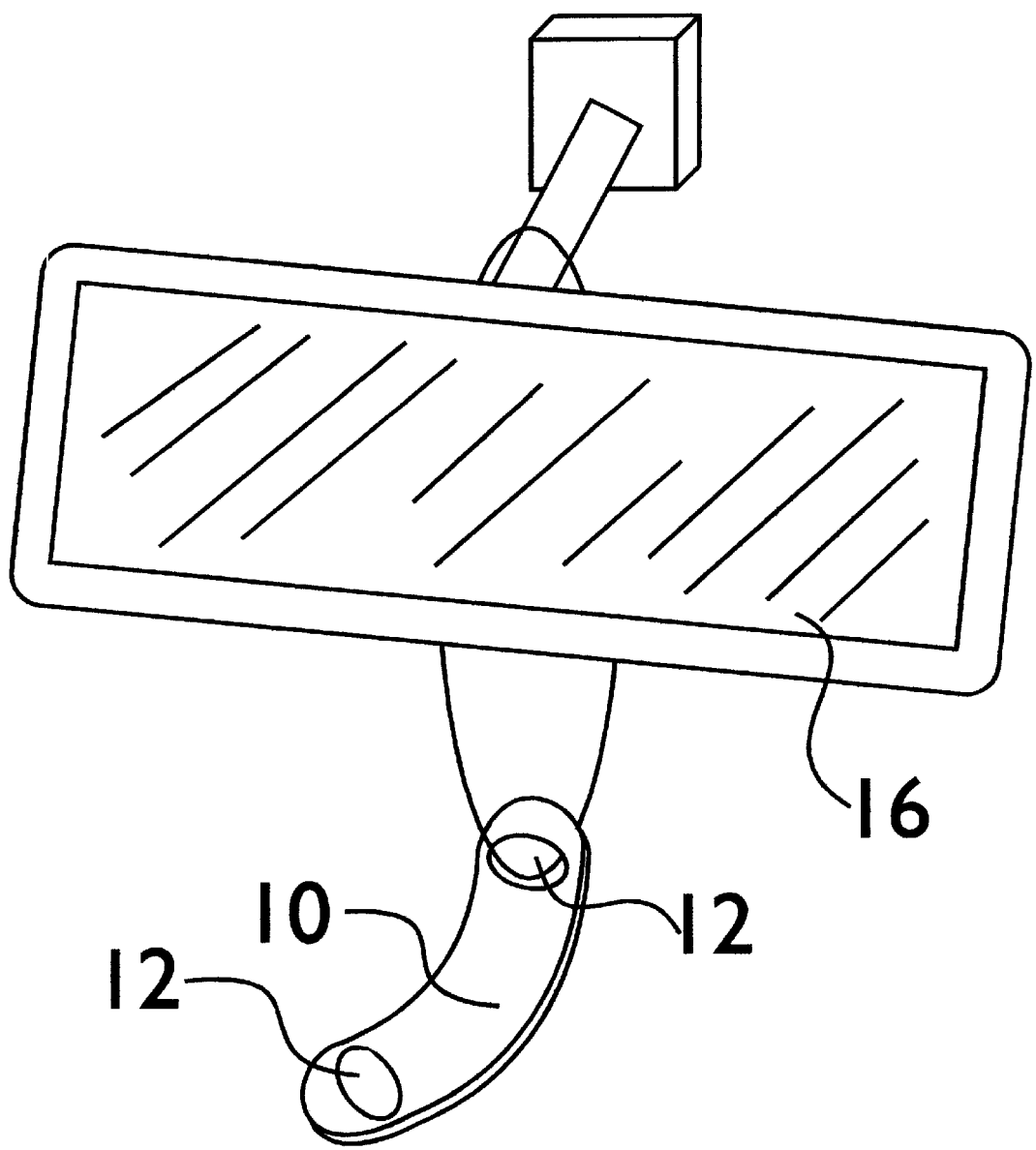
FIG. 4 shows a perspective view of the deodorant attachment patch attached to the rear view mirror of an automobile.

FIG. 4 shows a perspective view of the disposable attachment patch 10 attached to a rear view mirror 16. The attachment patch hangs onto the mirror 14 by using the slots 12.

Figure 5:
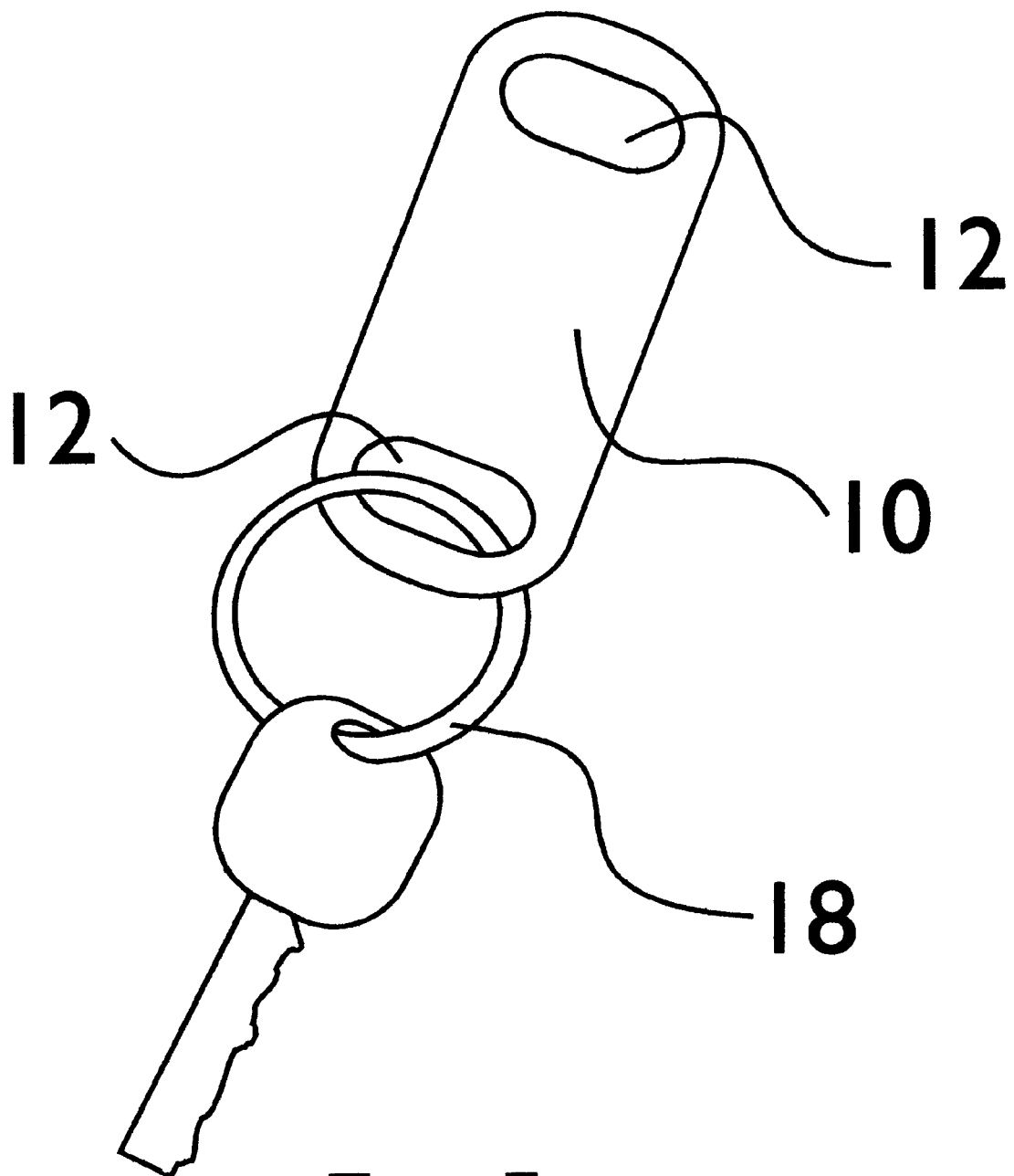
FIG. 5 shows a perspective view of the deodorant attachment patch attached to a key holder.

FIG. 5 shows a perspective view of the disposable attachment patch 10 attached to a key holder 18. The attachment patch uses the slots 12 to connect to the holder 18.

Operation —FIGS. 1,2,3,4, and 5

The drawings of FIGS. 1,2,3, 4 and 5 show a disposable attachment patch. The attachment patch 10 performs two basic functions. First function is to attach itself onto an existing collar/belt, key holder, gym bag, rear view mirror, etc., by using the slots 12. The slots 12 permit the patch 10 to slide onto the collar/belt, rearview mirror, or a key holder. The second function of the patch 10 is to release a deodorant substance that it has been impregnated with. The patch 10 releases a deodorant substance through it's pores. Thus providing a deodorant effect.

Summary, Ramification, and Scope

Accordingly, the reader will see that this disposable attachment patch offers many advantages.

deodorant patch specifically designed to provide a pleasant scent provides a cheap, and easy method for elimination of odors Although the description above accommodates many specificities, these should not be interpreted as limitations on the scope of the invention, but rather as an illustration of an embodiment thereof Many other variations are possible. For example, the shape of the patch itself can be altered. It can be made thinner, or thicker in appearance. The corners can be rounded, and the shape of the patch itself can be changed to accommodate many shapes. Nevertheless, the function still remains the same.

Thus the scope of the invention should be determined by the appended claims and their legal equivalents.

Conclusion

For all of the above reasons, applicant submits that the claims are now in proper form and that all define patentably over the cited prior art. Therefore, applicant submits that this application is now in condition for allowance, which action applicant respectfilly solicits.

Conditional Request For Constructive Assistance Applicant has amended the claims of this application so that they are proper, definite, and define novel structure which is also unobvious. If for any reason this application is not believed to be in full condition for allowance, applicant respectfully solicits the constructive assistance and suggestions of the Examiner pursuant to M.P.E.P. Section 706.03 (d) and Section 707.07 (j) in order that the undersigned can place this application in allowable condition as soon as possible and without the need for further proceedings.

I claim:

1. A fragrant animal collar attachment comprising:
   a planar patch consisting of a flexible porous material and having a plurality of elongated slots placed at end portions of said planar patch, wherein said planar patch is of a uniform thickness along the entire length thereof, and wherein said planar patch consists of a single layer of said porous material such that said porous materials is impregnated with a deodorizing substance.

2. The attachment of claim 1 wherein said patch can be of a porous material such as of a polymer, foam rubber, or felt based material.

3. The attachment of claim 1 wherein said slots are elongated the width of the said attachment, and are positioned at opposite ends of said attachments.

\* \* \* \* \*